United States Patent
Ishida et al.

(10) Patent No.: US 8,181,790 B2
(45) Date of Patent: May 22, 2012

(54) FLOTATION APPARATUS

(75) Inventors: Minoru Ishida, Tomakomai (JP);
Masami Kashibo, Tomakomai (JP);
Munetaka Sonoda, Tomakomai (JP);
Tomoaki Koyanagi, Tokyo (JP);
Tatsumi Hosaka, Tokyo (JP); Yoshihiko Aikawa, Shizuoka (JP)

(73) Assignees: Nippon Paper Industries Co., Ltd., Tokyo (JP); Aikawa Iron Works Co., Ltd., Shizuoka (JP)

( * ) Notice: Subject to any disclaimer, the term of this patent is extended or adjusted under 35 U.S.C. 154(b) by 322 days.

(21) Appl. No.: 12/451,215

(22) PCT Filed: Sep. 2, 2008

(86) PCT No.: PCT/JP2008/065756
§ 371 (c)(1),
(2), (4) Date: Oct. 30, 2009

(87) PCT Pub. No.: WO2009/031533
PCT Pub. Date: Mar. 12, 2009

(65) Prior Publication Data
US 2010/0134576 A1    Jun. 3, 2010

(30) Foreign Application Priority Data
Sep. 4, 2007 (JP) .................. 2007-228638

(51) Int. Cl.
*B03D 1/14* (2006.01)

(52) U.S. Cl. ....................................................... 209/168
(58) Field of Classification Search .................... 347/89;
209/162, 168, 169, 170; 210/220, 221.1, 210/221.2, 703
See application file for complete search history.

(56) References Cited

U.S. PATENT DOCUMENTS
1,187,822 A    6/1916    Eberenz
(Continued)

FOREIGN PATENT DOCUMENTS
EP    0 428 257    5/1991
(Continued)

OTHER PUBLICATIONS

Article of 'Response to Tight Conditions of Waste Paper Stock, New Model Flotator HyperCell' (p. 27 to p. 35) from the Technology Report of the 22nd Aikawa Tchnology Assembly in 2007 held at Hotel Associa Shizuoka Terminal on Apr. 19, 2007 and Aikawa Iron Works Co., Ltd. and Technology Center on Apr. 20, 2007 by Aikawa Iron Works Co., Ltd. (Patent Abstracts of Japan JP2009-062625 published Mar. 26, 2009).

*Primary Examiner* — Anh T. N. Vo
(74) *Attorney, Agent, or Firm* — Manabu Kanesaka

(57) ABSTRACT

A flotation apparatus F includes a tank 1 for receiving a liquid raw material, and introduces air into the tank 1 to generate bubbles for adsorbing print ink in the liquid raw material to the bubbles, thereby floating and separating the print ink. The flotation apparatus F includes a circulating device for circulating the liquid raw material by raising and then lowering the liquid raw material in the tank 1, an air supply tube 4 for supplying air into the tank 1, and an agitating member 5 provided in the tank 1 for taking the air from the air supply tube 4 and agitating the air for forming the air into fine bubbles. The agitating member 5 has a rotary shaft 51 held horizontally and a plurality of members 52 horizontally separately provided around an outer periphery. On a cross section transverse to a longitudinal direction of the tank 1, an outer periphery of the agitating member 5 is arranged on a lower side of the tank 1 and in a position at a downstream side of the liquid raw material relative to a vertical line V passing through a center of the tank 1.

5 Claims, 5 Drawing Sheets

U.S. PATENT DOCUMENTS

| | | |
|---|---|---|
| 1,744,785 A | 1/1930 | McTaggart |
| 2,771,993 A | 11/1956 | Wendt |
| 4,324,652 A | 4/1982 | Hack |
| 4,726,897 A | 2/1988 | Schweiss |
| 4,749,473 A | 6/1988 | Shioiri |
| 5,028,315 A | 7/1991 | Cruea |
| 5,108,586 A | 4/1992 | Iwashige et al. |
| 5,176,822 A * | 1/1993 | Iwashige et al. ............ 209/168 |
| 5,240,621 A * | 8/1993 | Elonen et al. ............... 210/787 |
| 5,814,229 A | 9/1998 | Lygren |

FOREIGN PATENT DOCUMENTS

| | | |
|---|---|---|
| JP | S61-245390 | 10/1986 |
| JP | H03-130483 | 6/1991 |
| JP | H04-011086 | 1/1992 |
| JP | U H04-123295 | 11/1992 |
| JP | U H05-35890 | 5/1993 |
| JP | 2790338 | 6/1998 |

\* cited by examiner

FLOTATION APPARATUS

FIELD OF THE ART

The present invention relates to a flotation apparatus, especially, a flotation apparatus that can increase the amount of adsorption of print ink or the like in a liquid raw material by air.

Conventionally, in order to remove the print ink included in used paper, there is an apparatus which leads air into the liquid raw material so that the air adsorbs the print ink in the liquid raw material, thereby floating and separating the print ink (for example, refer to FIG. 1 in Japanese Patent Document 1).

In the above-mentioned apparatus, a bubble generation apparatus forms fine bubbles, and enlarges the surface area of the air, so that the print ink or the like in the liquid raw material is further adsorbed.

Patent Document 1: Japanese Patent No. 2790338 (FIG. 2)

DISCLOSURE OF THE INVENTION

Problems to be Solved by the Invention

However, in the above-mentioned apparatus, a bubble generation apparatus comprising a turbine rotor is provided at a position leaning to the upstream side of a liquid raw material, so that due to an agitation generated by a rotation of the turbine rotor of the bubble generation apparatus, the upstream of the liquid raw material is facilitated, and a flow from the lower part to the upper part on the upstream side of the liquid raw material becomes faster. Accordingly, it is difficult for bubbles generated by the bubble generation apparatus to adsorb print ink or the like in the liquid raw material. Also, the liquid raw material reaches the upper surface of a flotation apparatus in a short period of time. Therefore, there is less chance to contact the print ink or the like in the liquid raw material with the bubbles. Moreover, due to the strong agitation generated by the rotation of the turbine rotor of the bubble generation apparatus, the print ink or the like attached to the bubbles falls off the bubbles, so that a collection effect of the ink or the like is reduced.

The purpose of the present invention is to provide a flotation apparatus to solve the above-mentioned problem.

Means for Solving the Problems

A flotation apparatus in the present invention includes a tank for receiving a liquid raw material, and leads air into the tank to generate bubbles so that the bubbles adsorb the print ink in the liquid raw material, thereby floating and separating the print ink. The floating apparatus has a circulating means for circulating the liquid raw material in the tank by raising and then lowering the liquid raw material in the tank, an air supply tube for supplying the air into the tank, and an agitating member provided in the tank for taking in the air from the air supply tube and agitating the air for forming the air into fine bubbles. The agitating member has a plurality of members having a rotary shaft held horizontally and also horizontally separately provided around the outer periphery. On a cross section transverse to the longitudinal direction of the tank, the outer periphery of the agitating member is arranged on a lower side of the tank and at a position closer to the downstream side of the liquid raw material than a vertical line passing through the center of the tank.

Also, as for the second aspect of the flotation apparatus, in the first aspect of the flotation apparatus, on a cross section transverse to the longitudinal direction of the agitating member, in the case that the cross section is viewed from a side wherein a rotational direction of the agitating member is a counterclockwise direction, an orthogonal coordinate wherein the rotational center of the agitating member is the origin, is divided into the first quadrant, the second quadrant, the third quadrant, and the fourth quadrant in a counterclockwise direction. At this time, the flotation apparatus includes an opposed wall which faces the agitating member and is positioned within an area of the third quadrant, or provided so as to range between the area of the third quadrant and the area of the fourth quadrant. An outlet of the air supply tube is positioned between the opposed wall and the agitating member.

Also, as for the third aspect of the flotation apparatus, in the first aspect of the flotation apparatus, on the cross section transverse to the longitudinal direction of the tank, a starting end of a flow regulation plate is positioned on the upper part of the agitating member, and the flow regulation plate is transverse beyond a vertical line passing through the center of the tank from the starting end. The end of the flow regulation plate is provided with a straight portion extending to the upper part of the tank.

Also, as for the fourth aspect of the flotation apparatus, in the third aspect of the flotation apparatus, a prevention wall which is attached to the lower part of the flow regulation plate and narrows a space between the flow regulation plate and the agitating member, is provided.

Also, as for the fifth aspect of the flotation apparatus, in the third aspect of the flotation apparatus according to claim 3, the prevention wall which is attached to the lower part of the flow regulation plate, narrows the space between the flow regulation plate and the agitating member, and includes an inclined surface which is inclined so that the liquid raw material is directed to the flow regulation plate, is provided.

Effects of the Invention

According to a first aspect of a flotation apparatus, on the cross section transverse to the longitudinal direction of the tank, the outer periphery of the agitating member is arranged on the lower side of the tank and at a position closer to the downstream side of the liquid raw material than the vertical line passing through the center of the tank, so that an action that the raw material in the downstream is pulled downwardly works strongly by the agitating member. Accordingly, compared to the agitating member that is provided on the upstream side of the liquid raw material, the flow of the raw material from the upper part to the lower part on the downstream side becomes smooth, and the number of times the raw material circulates on the cross section transverse to the longitudinal direction of the tank increases. As a result, the number of contacts between the raw material and the bubbles increases. The ink or the like captured in the bubbles is separated from the liquid raw material at the upper part of the tank. Since the number of repetitions of the above-mentioned operation increases, the amount of adsorption of the print ink or the like in the liquid raw material by the bubbles can be increased. Also, the bubbles generated by the agitation by the agitating member are positioned on the downstream side of the liquid raw material, and since the distance reaching the upper part of the tank becomes longer, the chance that the print ink or the like in the liquid raw material contacts the bubbles generated by the agitation by the agitating member increases. Accordingly, the amount of adsorption of the print ink or the like in the liquid raw material by the bubbles can be increased.

Also, according to the second aspect of the flotation apparatus, an opposed wall faces the agitating member and is also positioned within an area of the third quadrant of the orthogonal coordinate wherein the rotational center of the agitating member is the origin, or provided so as to range between the area of the third quadrant and an area of the fourth quadrant. Since an outlet of the air supply tube is positioned between the opposed wall and the agitating member, the air is captured between the opposed wall and the agitating member, and a part of the captured air floats and is agitated by the agitating member. Accordingly, the air is made small. To the extent that the air is made small, the surface area of the air increases, so that the print ink or the like in the liquid raw material can be further adsorbed.

Also, according to the third aspect of the flotation apparatus, on a cross section transverse to the longitudinal direction of the tank, a starting end of a flow regulation plate is arranged on the upper part of the agitating member, and the flow regulation plate is transverse beyond a vertical line passing through the center of the tank from the starting end. The end of the flow regulation plate is provided with a straight portion extending to the upper part of the tank, so that the elevation of the bubbles generated by the agitating member is blocked by the flow regulation plate. Accordingly, to the extent of the blocked elevation of the bubbles, the chance that the print ink or the like in the liquid raw material contacts the bubbles increases, and the amount of adsorption of the print ink or the like in the liquid raw material by the bubbles can be increased.

Also, according to the fourth aspect of the flotation apparatus, since the prevention wall is attached to the lower part of the flow regulation plate and narrows a space between the flow regulation plate and the agitating member, the bubbles generated from the agitating member and the bubbles to which the print ink or the like in the liquid raw material is attached, can be prevented from flowing into the downstream side of the liquid raw material from the upstream side of the liquid raw material. Accordingly, the blocking of the flow of the downstream of the liquid raw material can be prevented.

Also, according to the fifth aspect of the flotation apparatus, the prevention wall attached to the lower, part of the flow regulation plate, narrowing the space between the flow regulation plate and the agitating member, and including an inclined surface so that the liquid raw material is directed to the flow regulation plate, is provided. As a result, the bubbles generated from the agitating member and the bubbles to which the print ink or the like in the liquid raw material is attached, can be prevented from flowing into the downstream side of the liquid raw material from the upstream side of the liquid raw material. Also, through the inclined surface of the prevention wall, the prevention wall guides the bubbles or the like to the flow regulation plate, and this increases the chance for the bubbles to contact the print ink or the like in the liquid raw material. Accordingly, the amount of adsorption of the print ink or the like in the liquid raw material by the bubbles can be increased.

| Explanation of symbols | |
|---|---|
| F | Flotation apparatus |
| 1 | Tank |
| 4 | Air supply tube |
| 5 | Agitating member |
| 51 | Rotary shaft |
| 52 | Members |

BEST MODE FOR CARRYING OUT THE INVENTION

Embodiments of a flotation apparatus of the present invention will be explained with reference to the drawings.

In FIGS. 1-5, the reference alphabet F represents the flotation apparatus, and the flotation apparatus F is an apparatus for leading air into a tank 1 to generate bubbles, and adsorbing print ink in a liquid raw material to the bubbles, thereby floating and separating the print ink. The tank 1 receives the liquid raw material from an introduction tube 2 for introducing the liquid raw material, and removes the print ink or the like inside the tank 1, so that the liquid raw material from which the print ink or the like is removed is guided to the outside of the tank 1 through a derivation tube 3.

Figure 1:
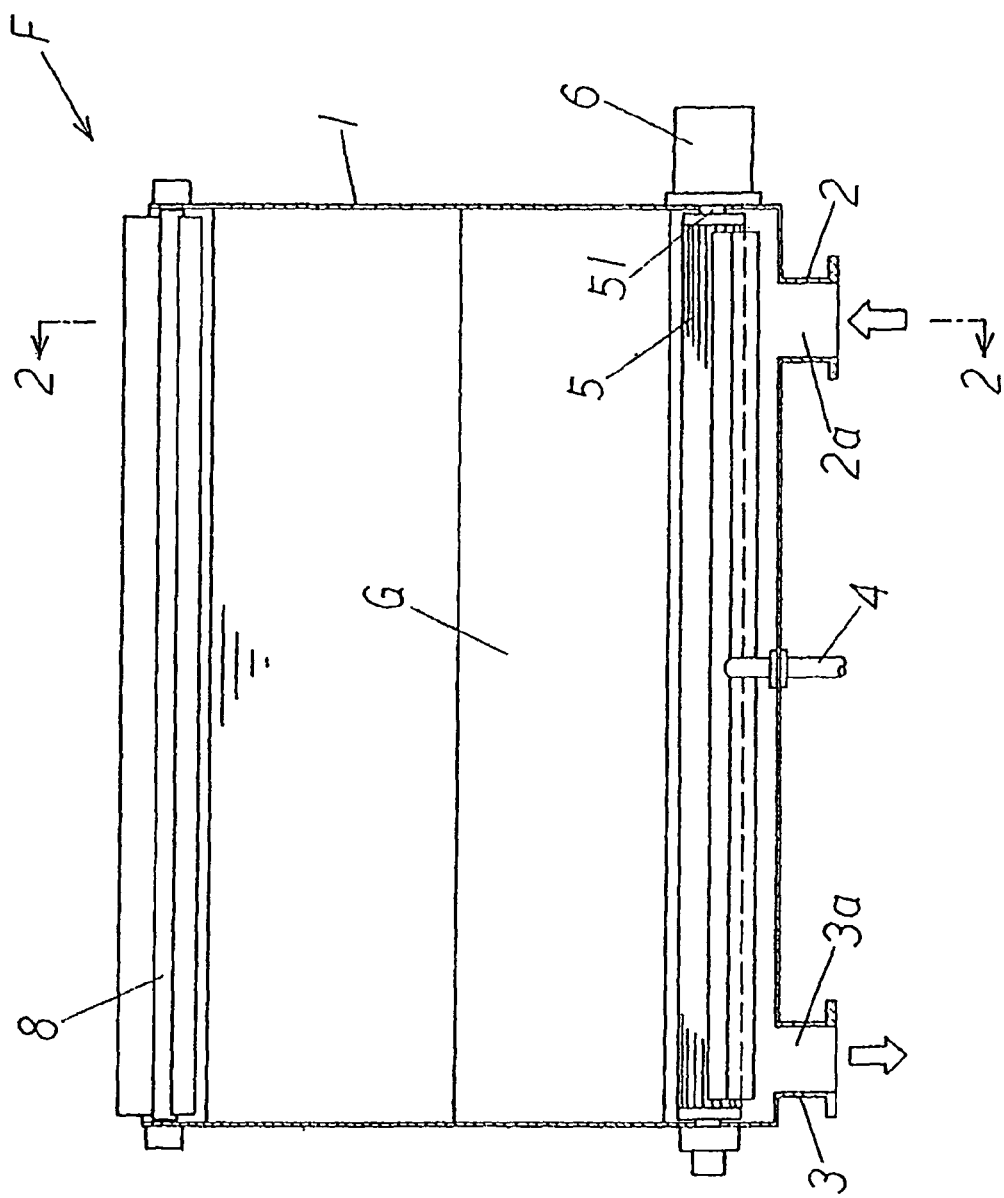
FIG. 1 is a schematic cross sectional view of a flotation apparatus of the first embodiment of the present invention.
Figure 2:
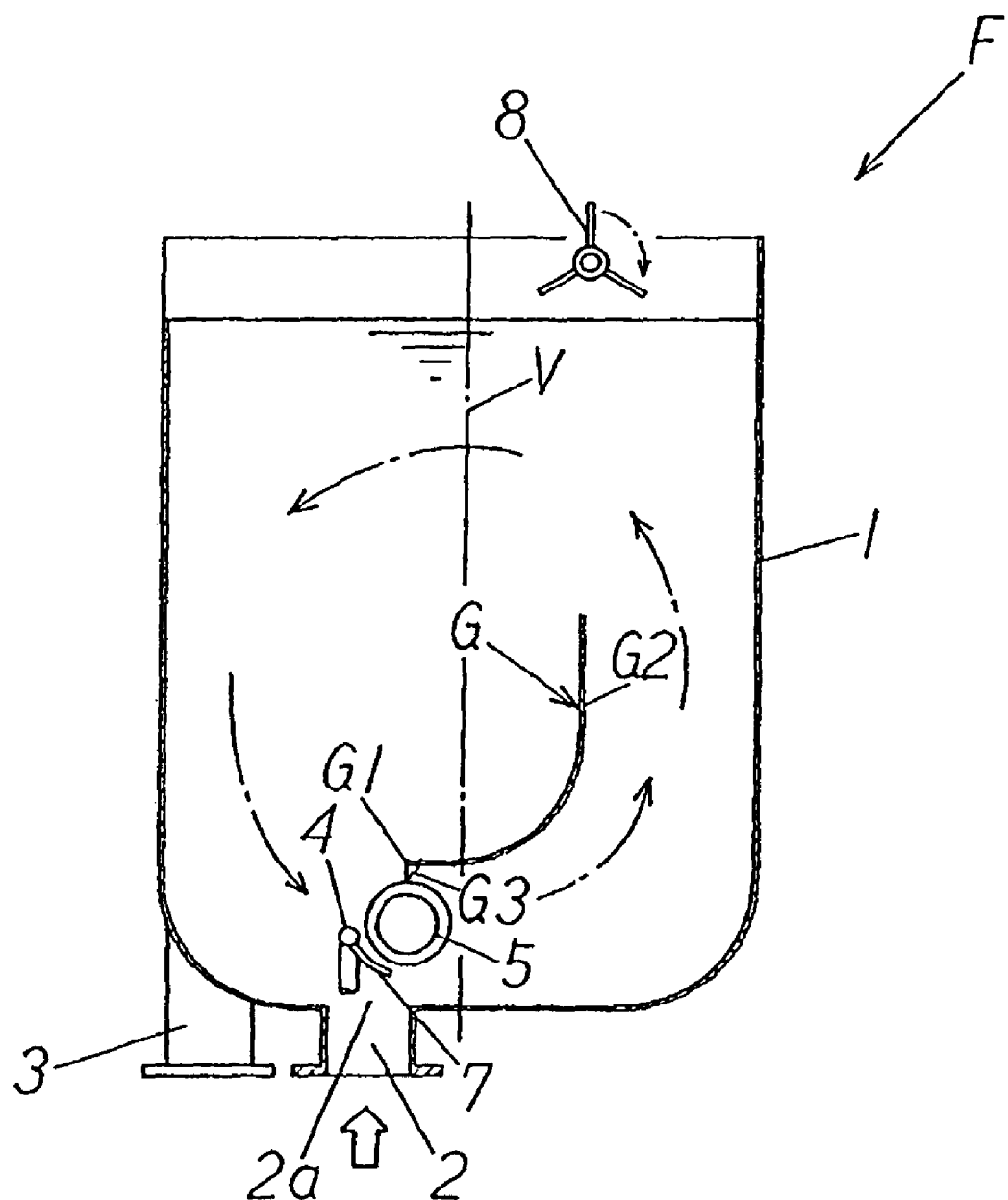
FIG. 2 is a schematic cross sectional view taken along line 2-2 in FIG. 1.
Figure 3:
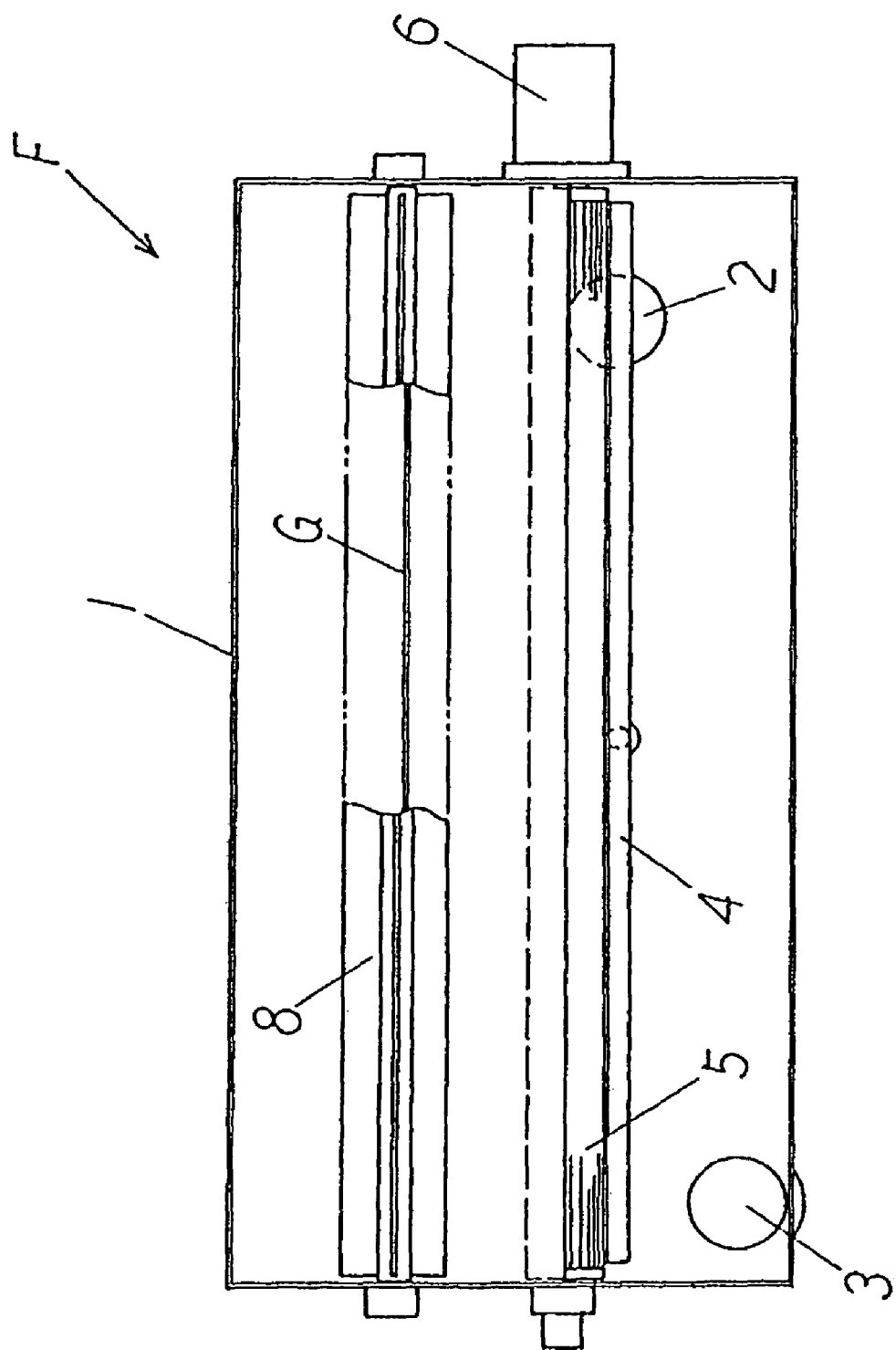
FIG. 3 is a schematic plan view in FIG. 2.

The liquid raw material in the tank 1, as shown in FIG. 2, is elevated and then lowered by a circulating means. The circulating means is constituted by, for example, an inlet flow of the liquid raw material flowing toward the upper part of the tank 1 close to an entrance portion 2a which opens at the bottom portion of the tank 1 of the introduction tube 2; and an outlet flow of the liquid raw material discharged toward the lower part of the tank 1 close to an exit portion 3a which opens at the bottom portion of the tank 1 of the derivation tube 3. As shown in FIG. 1, the entrance portion 2a is positioned close to a right side plate of the tank 1, and the exit portion 3a is positioned close to a left side plate of the tank 1, respectively. The entrance portion 2a and the exit portion 3a are separated from each other.

Figure 5:
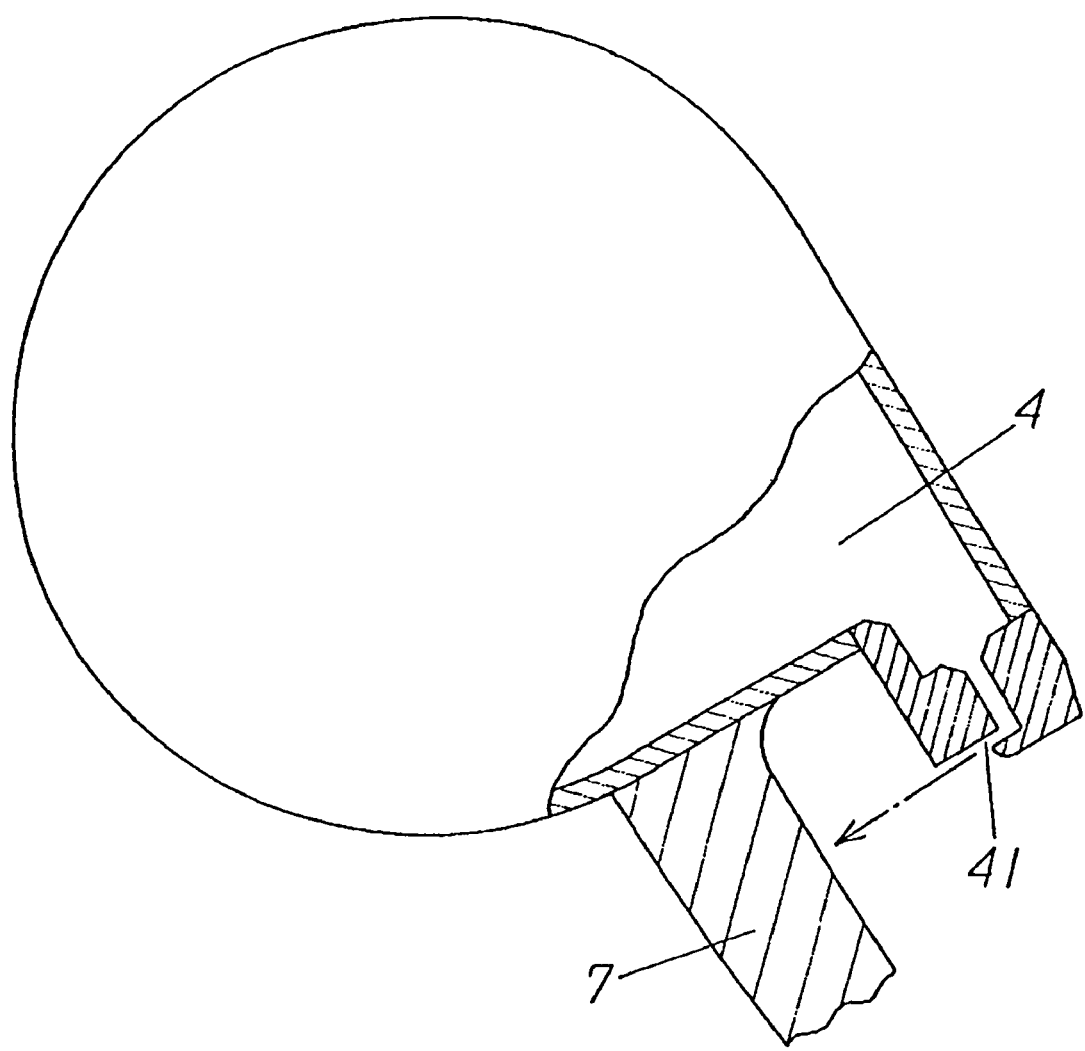
FIG. 5 is a partially enlarged schematic sectional view where a portion in FIG. 4 is enlarged.

The reference numeral 4 represents an air supply tube for supplying the air into the tank 1, the reference numeral 41 shown in FIG. 5 represents an outlet of the air supply tube 4, and the outlet 41 is formed so as to face downwardly. The reason why the outlet 41 faces downwardly is to prevent the liquid raw material from entering into the air supply tube 4 in the case that the air of the air supply tube 4 is halted.

Figure 4:
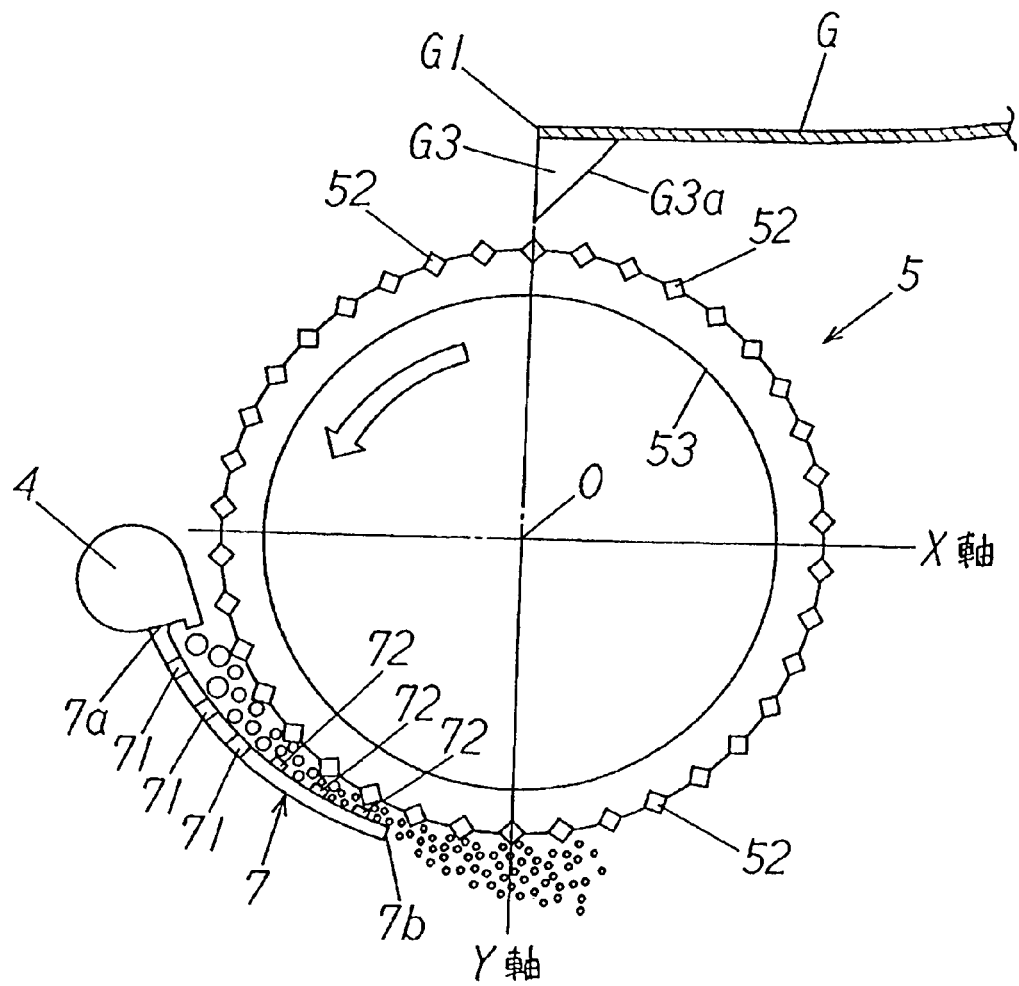
FIG. 4 is a partially enlarged schematic sectional view where a portion in FIG. 2 is enlarged.

Also, the reference numeral 5 shown in FIG. 4 represents an agitating member provided in the tank 1 for taking in the air from the air supply tube 4 and agitating the air for forming the air into fine bubbles. The agitating member 5 has a rotary shaft 51 which is rotated at high speed by a motor 6 and held horizontally. Also, the shape of the whole agitating member 5 is an approximately cylindrical shape, and the agitating member 5 has a plurality of members 52 (the members 52 are, for example, longitudinal-shaped members) horizontally separately provided around the outer periphery. The reference numeral 53 represents a cylindrical rotary drum, and the plurality of members 52 is positioned on the outside of the rotary drum 53.

Also, the reference alphabet G shown in FIG. 2 represents a flow regulation plate (guide plate) guiding the flow of the liquid raw material so that there is no short circuit of ascending liquid raw material and descending liquid raw material.

A starting end G1 of the flow regulation plate G, as shown in FIGS. 2, 4, is positioned on the upper part of the agitating member 5, and the flow regulation plate G is transverse beyond a vertical line V passing through the center of the tank 1 from the starting end G1. The end of the flow regulation plate G is provided with a straight portion G2 extending to the upper part of the tank 1. The straight portion G2, for example, is a vertical portion which is vertical to a horizontal surface.

As for the bubbles generated by the agitating member 5, the elevation thereof is blocked by the flow regulation plate G, so that for the blocked portion, the chance of the print ink or the like in the liquid raw material contacting with the bubbles increases, and the amount of adsorption of the print ink or the like in the liquid raw material by the bubbles can be increased.

Also, the reference sign G3 shown in FIGS. 2, 4 represents a prevention wall. The prevention wall G3 is attached to the lower part of the flow regulation plate G, and narrows a space between the flow regulation plate G and the agitating member 5. Also, the prevention wall G3 includes an inclined surface G3a which is inclined so that the liquid raw material is guided to the flow regulation plate G.

The prevention wall G3 prevents the bubbles generated from the agitating member 5 and the bubbles to which the print ink or the like in the liquid raw material is attached from flowing into the downstream side of the liquid raw material from the upstream side of the liquid raw material. Also, through the inclined surface G3a of the prevention wall G3, the prevention wall G3 guides the bubbles or the like to the flow regulation plate G, and this increases the chance of the bubbles contacting the print ink or the like in the liquid raw material. Accordingly, the amount of adsorption of the print ink or the like in the liquid raw material by the bubbles can be increased.

Also, as shown in FIG. 2, on a cross section transverse to the longitudinal direction of the tank 1, the outer periphery of the agitating member 5 is arranged on the lower side of the tank 1 and at a position closer to the downstream side of the liquid raw material than a vertical line V passing through the center of the tank 1. Also, as shown in FIG. 4, on the cross section transverse to the longitudinal direction of the agitating member 5, in the case that the cross section is viewed from a side wherein a rotational direction of the agitating member 5 is a counterclockwise direction, an orthogonal coordinate (a horizontal direction passing through an origin O is an X axis, and an axis passing through the origin O and orthogonal to the X axis is a Y axis) where the rotational center of the agitating member 5 is the origin O, is divided to the first quadrant, the second quadrant, the third quadrant, and the fourth quadrant in a counterclockwise direction. At this time, the outlet 41 of the air supply tube 4 is positioned outside of the agitating member 5 in the third quadrant of the orthogonal coordinate. The reference numeral 7 represents an opposed wall, and the opposed wall 7 is provided so as to face the agitating member 5. Also, one end 7a is connected to the air supply tube 4, and the other end 7b is provided in the area of the third quadrant of the orthogonal coordinate. Also, the opposed wall 7 includes openings 71 allowing the inflow of the liquid raw material.

Incidentally, in the drawings, the opposed wall 7 is provided. However, in some cases, the opposed wall 7 may be omitted. Also, although a plurality of openings 71 is formed, the opening 71 may be a single opening, or in some cases, the openings 71 may not have to be provided.

Especially, the outlet 41 of the supply tube 4 is positioned between the opposed wall 7 and the agitating member 5, so that the air is captured between the opposed wall 7 and the agitating member 5. A part of the captured air floats and is agitated by the plurality of members 52 of the agitating member 5. Accordingly, the air is made small, and to the extent that the air is made small, the surface area of the air increases, and the "print ink", "fine adhesive foreign matter", or the like which is unnecessary for recycled paper in the liquid raw material, is combined with the fine bubbles, and can be adsorbed to the bubbles.

The print ink or the like in the liquid raw material which is adsorbed to the bubbles is elevated to an upper part of the tank 1 together with the flow of the liquid raw material, and a froth layer (not shown) is formed on the upper part of the tank 1. The froth layer (not shown) is gathered to a froth receiver (not shown) by a froth paddle 8, and discharged from the tank 1.

Incidentally, on the cross section transverse to the longitudinal direction of the tank 1, the outer periphery of the agitating member 5 is arranged on the lower side of the tank 1 and at a position closer to the downstream side of the liquid raw material than the vertical line V passing through the center of the tank 1, so that an action that the raw material in the downstream is pulled in downwardly works strongly by the agitating member 5. Accordingly, compared to the agitating member 5 that is provided on the upstream side of the liquid raw material, the flow of the raw material from the upper part to the lower part on the downstream side becomes smooth, and the number of times the raw material circulates on the cross section transverse to the longitudinal direction of the tank 1 increases. As a result, the number of contacts between the raw material and the bubbles increases. The ink or the like captured in the bubbles is separated from the liquid raw material at the upper part of the tank 1. Since the number of repeating times of the above-mentioned operation increases, the amount of adsorption of the print ink or the like in the liquid raw material by the bubbles can be increased. Also, the bubbles generated by the agitation by the agitating member 5 are positioned on the downstream side of the liquid raw material, and since the distance to the upper part of the tank 1 becomes longer, the chance of the print ink or the like in the liquid raw material contacting with the bubbles generated by the agitation by the agitating member 5 increases. Accordingly, the amount of adsorption of the print ink or the like in the liquid raw material by the bubbles can be increased.

Also, since the openings 71 allowing the inflow of the liquid raw material are provided in the middle of the opposed wall 7, the air captured between the opposed wall 7 and the agitating member 5 can be efficiently supplied to the liquid raw material which inflows from the openings 71, and the print ink or the like in the liquid raw material can be efficiently adsorbed.

Also, the agitating member 5 includes the cylindrical rotary drum 53, and the plurality of members 52 which is horizontally separately provided on the outside of the rotary drum 53, so that the air flowing into the agitating member 5 cannot cut across the inside of the agitating member 5 due to the cylindrical rotary drum 53, and is captured between the rotary drum 53 and the plurality of members 52. As a result, the air can be made small by the agitation by the agitating member 5, so that the print ink or the like in the liquid raw material can be efficiently adsorbed.

Also, since as for a space between the opposed wall 7 and the agitating member 5, the downstream side of a rotational direction of the agitating member 5 is formed narrower than the upstream side of the rotational direction of the agitating member 5, the bubbles can be efficiently contacted with the liquid raw material flowing out between the agitating member 5 and the opposed wall 7, so that the print ink or the like in the liquid raw material can be efficiently adsorbed.

In addition, since convexes 72 are formed on a surface facing the agitating member 5 of the opposed wall 7, the air bumps against the convexes 72 and is made small. Due to the air made small, the print ink or the like in the liquid raw material can be further adsorbed.

In this way, the liquid raw material wherein the print ink or the like is eliminated inside the tank 1 is guided to the outside of the tank 1 by the derivation tube 3.

Incidentally, in the embodiment, the other end 7b of the opposed wall 7 is positioned inside the area of the third quadrant of the orthogonal coordinate (refer to FIG. 4). However, the present invention is not limited to the above, and the other end 7b of the opposed wall 7 may extend to the area of the fourth quadrant of the orthogonal coordinate. Even in such a case, the other end 7b of the opposed wall 7 is set in the downstream side of the liquid raw material relative to the vertical line V (refer to FIG. 2) passing through the center of the tank 1.

What is claimed is:

1. A flotation apparatus having a tank for receiving a liquid raw material and introducing air into the tank to generate bubbles, thereby adsorbing print ink in the liquid raw material to the bubbles to float and separate the print ink, comprising:
    circulating means for circulating the liquid raw material by raising and then lowering the liquid raw material in the tank;
    an air supply tube for supplying the air into the tank; and
    an agitating member provided in the tank for receiving the air from the air supply tube and agitating the air for forming the air into fine bubbles,
    wherein the agitating member has a rotary shaft held horizontally and a plurality of members horizontally separately provided around an outer periphery thereof,
    on a cross section transverse to a longitudinal direction of the tank, the outer periphery of the agitating member is arranged on a lower side of the tank and at a downstream side of the liquid raw material relative to a vertical line passing through a center of the tank,
    on a cross section transverse to a longitudinal direction of the agitating member, in a case that the cross section is viewed from a side wherein a rotational direction of the agitating member is a counterclockwise direction,
    when an orthogonal coordinate wherein a rotational center of the agitating member is an origin, is divided to a first quadrant, a second quadrant, a third quadrant, and a fourth quadrant in a counterclockwise direction, an opposed wall facing the agitating member is positioned within an area of the third quadrant, or in a range between the third quadrant and the fourth quadrant, and
    an outlet of the air supply tube is positioned between the opposed wall and the agitating member.

2. A flotation apparatus according to claim 1, wherein the opposed wall includes openings adapted to allow the inflow of the liquid raw material.

3. A flotation apparatus having a tank for receiving a liquid raw material and introducing air into the tank to generate bubbles, thereby adsorbing print ink in the liquid raw material to the bubbles to float and separate the print ink, comprising:
    circulating means for circulating the liquid raw material by raising and then lowering the liquid raw material in the tank;
    an air supply tube for supplying the air into the tank; and
    an agitating member provided in the tank for receiving the air from the air supply tube and agitating the air for forming the air into fine bubbles,
    wherein the agitating member has a rotary shaft held horizontally and a plurality of members horizontally separately provided around an outer periphery thereof,
    on a cross section transverse to a longitudinal direction of the tank, the outer periphery of the agitating member is arranged on a lower side of the tank and at a downstream side of the liquid raw material relative to a vertical line passing through a center of the tank, and
    on the cross section transverse to the longitudinal direction of the tank, a starting end of a flow regulation plate is positioned on an upper part of the agitating member, and the flow regulation plate traverses the vertical line passing through the center of the tank from the starting end, and a tip portion of the flow regulation plate is provided with a straight portion extending to an upper part of the tank.

4. A flotation apparatus according to claim 3, further comprising a prevention wall attached to a lower part of the flow regulation plate and narrowing a space between the flow regulation plate and the agitating member.

5. A flotation apparatus according to claim 3, further comprising a prevention wall attached to a lower part of the flow regulation plate for narrowing a space between the flow regulation plate and the agitating member, said prevention wall having an inclined surface inclined so that the liquid raw material is directed to the flow regulation plate.

* * * * *